July 31, 1956  P. J. LANSING ET AL  2,756,626
APPARATUS FOR DETECTING PARTICLES IN FLUIDS
Filed Nov. 15, 1951  2 Sheets-Sheet 1

Inventors
Paul J. Lansing
William J. Krodel

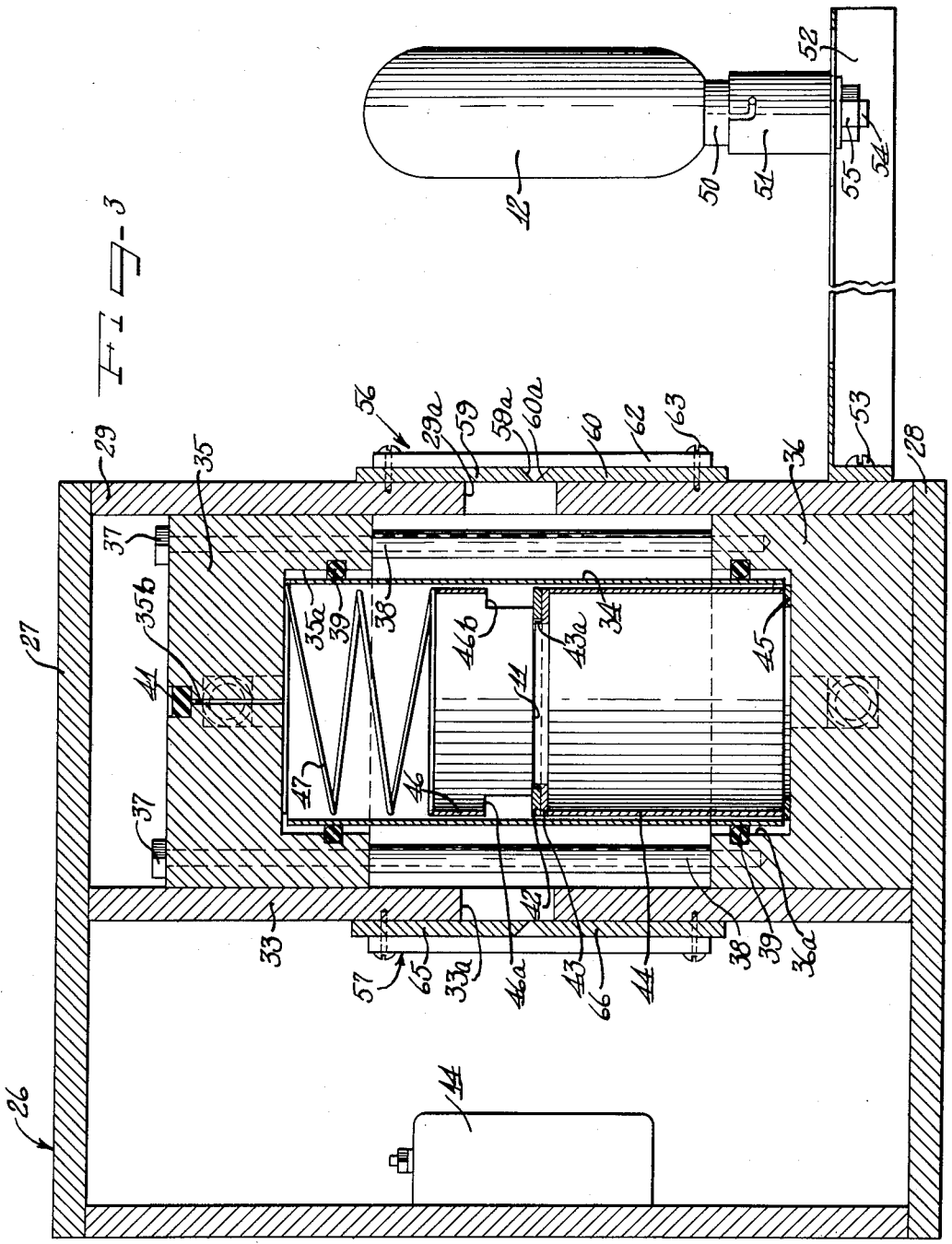

2,756,626

APPARATUS FOR DETECTING PARTICLES IN FLUIDS

Paul J. Lansing and William J. Krodel, Los Angeles, Calif., assignors to Thompson Products, Inc., Cleveland, Ohio, a corporation of Ohio Application November 15, 1951, Serial No. 256,416

3 Claims. (Cl. 88—14)

This invention relates to a method and an apparatus for detecting particles in fluids and more particularly to detection of particles by accumulating the particles on a filter, projecting a narrow beam of radiant energy across the filter and measuring the reduction in radiant energy resulting from the accumulation of particles on the filter.

According to this invention, a filter is disposed in a fluid flow line. A light source is disposed at one side of the filter and the light is focused over the surface of the filter to a photo-electric cell disposed on the other side of the filter. Particles collecting on the filter will obstruct the light to the photo-electric cell and reduce the output thereof. The output may be connected to a galvanometer or to any electrically responsive indicating or signalling device. The filter may have openings of micro dimensions and the beam of light over the filter may be very narrow so that the device is extremely sensitive and can detect and measure a minute accumulation of minute particles.

The method and apparatus of this invention are particularly adapted for the measurement of changing temperature effects on the physical characteristics of organic liquids. In aircraft fuel systems, for example, low temperatures are experienced which may result in the formation of water-ice and wax precipitates in the organic fuels which may clog the fuel lines and result in inefficient combustion. These precipitates, when initially formed, are extremely small and difficult to detect and measure by any conventional instruments. With this invention, the openings in the filter are small enough to accumulate the precipitates thereon and the beam of light is sharply focused over the filter so that even a minute accumulation of particles on the filter will reduce the light to the photo-electric cell and give a positive indication of the presence of the precipitates.

In accordance with other features of this invention, a mounting structure is provided for the lamp, filter, photo-electric cell and focusing elements by which a narrow beam of light can be projected across the face of the filter and to the photo-electric cell to provide maximum sensitivity with a minimum of trouble that might otherwise be experienced from relative movement and vibration of the elements of the apparatus. Provision is made for the measurement of the temperature of the fluid and of the differential and pressure across the filter for calibration and experimental purposes. Further, the apparatus is so constructed as to be readily assembled and disassembled.

An object of this invention, accordingly, is to provide an improved method for detecting and measuring particles in fluids.

Another object of this invention is to provide highly sensitive and reliable apparatus for the detection of particles in fluids.

Other objects, features and advantages of the present invention will become more fully apparent from the following detailed description taken in conjunction with the accompanying drawings which illustrate a preferred embodiment and in which:

Figure 3 is a sectional view taken substantially along line III—III of Fig. 2.

Figure 1:
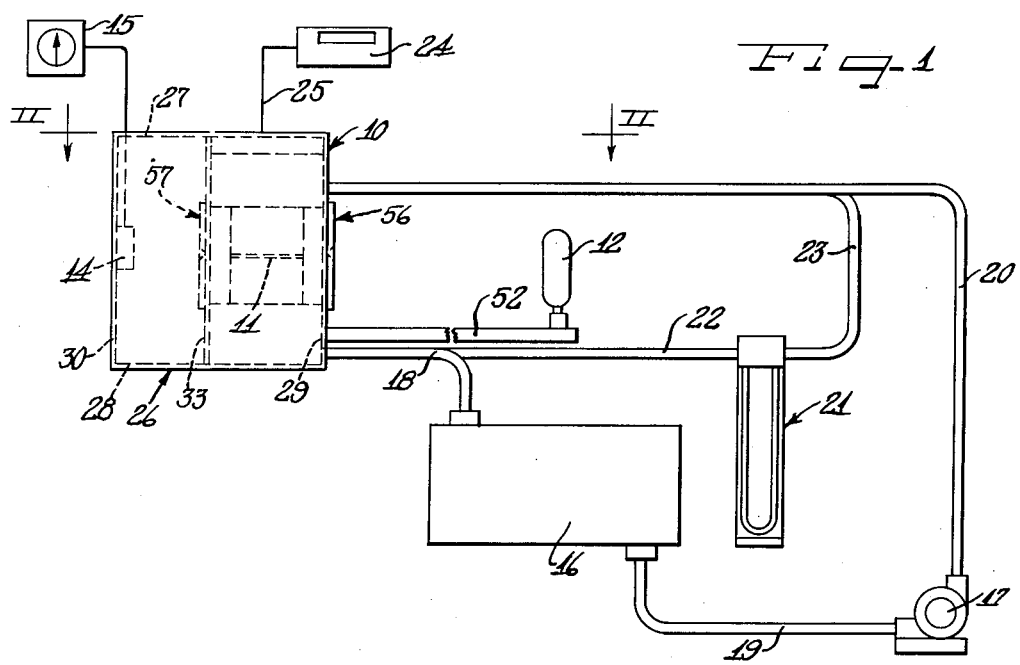
Figure 1 is a view illustrating an assembly of a fluid flow and filter chamber, a photo-electric cell and a lamp connected in a fluid flow system and provided with measuring equipment including a thermo-couple, a galvanometer and a manometer.

Referring to Fig. 1, reference numeral 10 generally designates a detecting or measuring device constructed according to this invention. The device 10 includes, in general, a filter 11, a light source 12 at one side of the filter 11 and a photo-electric cell 14 at the other side of the filter 11. Particles collecting on the filter 11 will obstruct the light from the light source 12 to the photo-electric cell 14 to reduce the output of the photo-electric cell. The photo-electric cell 14 may be connected to a galvanometer 15 or to any electrically responsive device desired.

For flow of fluid through the filter 11, a fluid reservoir 16 and a pump 17 are provided. The reservoir 16 is connected through a line 18 to the device 10 below the filter 11. The pump 17 has an inlet connected through a line 19 to the reservoir 16 and a discharge connected through a line 20 to the device 10 above the filter 11. Accordingly, when the pump 17 is actuated fluid will be circulated from the reservoir 16 through the line 19 through the pump 17 out through the line 20 to the device 10, through the filter 11 and back through the line 18 to the reservoir.

If desired, a manometer 21 may be connected through lines or conduits 22 and 23 below and above the filter 11 to measure any differential in pressure which may exist across the filter 11 due to accumulation of particles. Also, a pyrometer 24 may be connected through thermocouple leads 25 to measure the temperature of the fluid in the device 10. It will be understood that the manometer 21 and the pyrometer 24 may be dispensed with, if desired, but they are useful for calibration and experimental purposes.

Figure 2:
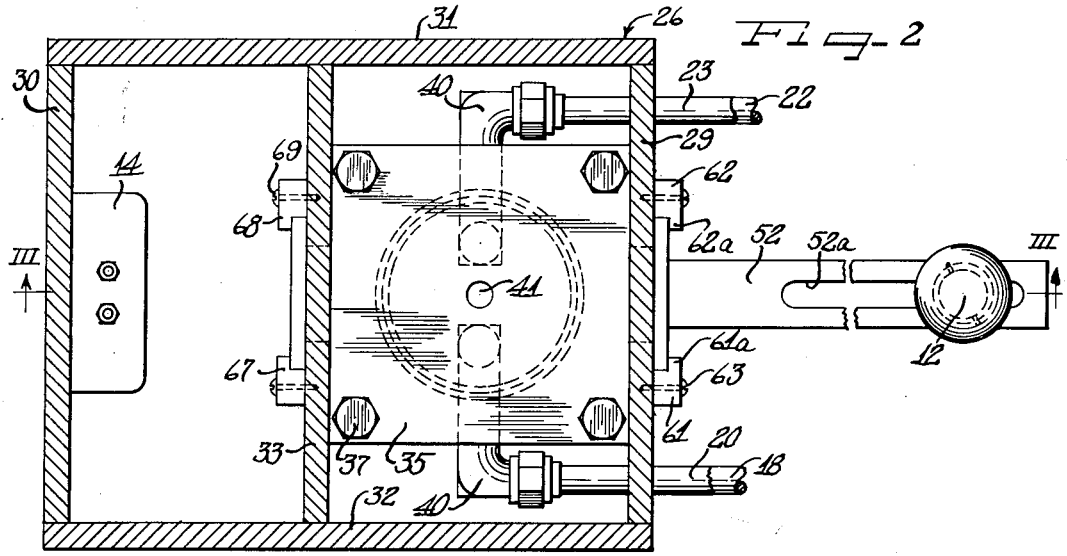
Figure 2 is an enlarged sectional view taken substantially along the line II—II of Fig. 1 and illustrating the assembly and housing of the photo-electric cell, filter and lamp.

Referring now to the detail views of Figs. 2 and 3, the indicating or measuring device 10 includes a substantially light-tight housing generally designated by reference numeral 26 and having a top 27, a bottom 28, a front end wall 29, a rear end wall 30, side walls 31 and 32 and a partition 33. The front wall 29 and the partition 33 have aligned openings 29a and 33a, respectively, for the passage of light therethrough.

A fluid flow and filter chamber is provided in the space between the front end wall 29 and the partition 33. This chamber is herein defined by a glass tubing section 34 seated between upper and lower caps 35 and 36, respectively. The caps 35 and 36 are secured together in spaced relation by bolts 37 extending through spacing sleeves 38. The facing portions of the caps 35 and 36 have cylindrical recesses 35a and 36a, respectively, which receive the ends of the glass tubing section 34. The section 34 is herein held in place by resilient sealing rings 39 disposed in internal annular recesses in the end caps 35 and 36.

The caps 35 and 36 have flow passages therein communicating with the recesses 35a and 36a and with the sides of the caps and the conduits or lines 18, 20, 22 and 23 from the reservoir 16, the pump 17 and the manometer 21 are connected with the passages in the caps by suitable elbow fittings 40. The upper cap 35 also has a small thermo-couple lead-receiving aperture 35b sealed by a plug 41.

The filter 11 may be of any desired material depending upon the fluid with which the device is used and the size of the particles to be detected and measured. Parchmentized paper having openings of micro dimensions may, for example, be provided. The filter 11 is herein held between an upper annular ring 42 and a lower ring 43, the lower ring 43 having an upturned flange 43a. The outer edge of the filter 11 is clamped between the flange 43a and the inner surface of the upper ring 42. The rings 42 and 43 may be secured together in any desired manner and are seated on a tube 44 disposed within the glass tubing section 34. The tube 44 is, in turn, seated on an annular resilient ring in the recess 36a of the bottom cap 36.

To firmly seat the filter-holding rings 42 and 43 on the tube 44, and the tube 44 on the rings 45, a short tube 46 is pressed against the ring 41 by a helical compression spring 47 abutting the end cap 35. The short tube 46 has diametrically opposed slots 46a and 46b therein to allow for the transmission of light over the filter 11.

The light source 12 is herein an electrical lamp bulb having a conventional bayonet base 50 adapted to be secured in a bayonet receptacle 51. The receptacle 51 is adjustably secured to a support member 52 which projects horizontally from the front wall 29 of the housing and is secured thereto by means of a screw 53. The lamp support member 52 has an inverted U-shaped cross-section and has an elongated slot 52a in the bight portions thereof. The receptacle 51 has a threaded portion projecting from the lower end thereof and through the slot 52a in the support member 52 and a nut 55 is threaded on the threaded portion 54 so that the position of the lamp with respect to the housing can be adjusted and the lamp secured in position at the optimum distance from the housing.

Means are provided for focusing a narrow beam of light from the light source 12 over the filter 11 and to the photo-electric cell 14. To this end, an adjustable shutter generally designated by reference numeral 56 is provided on the front wall 29 of the housing between the light source 12 and the filter 11 and an adjustable shutter generally designated by reference numeral 57 is provided on the partition 33 between the filter 11 and the photo-electric cell 14.

The shutter 56 includes an upper plate 59 having a lower beveled edge 59a and a lower plate 60 having an upper beveled edge 60a, the beveled edges 59a and 60a together defining a thin aperture or slot for the passage of light from the light source 12 over the filter 11. The plates 59 and 60 are adjustably clamped to the front wall 29 of the housing by side members 61 and 62 secured to the front wall 29 by screws 63 and have inwardly projecting integral flanges 61a and 62a, respectively, for engaging and clamping the plates 59 and 60 to the wall 29. If desired, tension spring means may be provided between the upper and lower plates 59 and 60 for urging them toward each other and facilitating adjustment.

The shutter 57 is constructed similarly to the shutter 56 and includes an upper plate 65, a lower plate 66, and side members 67 and 68 secured to the partition 33 by screws 69 for adjustably clamping the plates 65 and 66 to the partition 33 between the filter 11 and the photo-electric cell 14.

It will be appreciated that the shutters 56 and 57 may be adjusted to project a very narrow beam of light across the filter 11 and to the photo-electric cell 14 so that a minute accumulation of minute particles may appreciably reduce the light striking the photo-electric cell 14. Thus an extremely sensitive device is provided by this invention. This extremely sensitive device is particularly adapted for the measurement of water-ice formation, fuel wax precipitation, cloud points and miscibility gaps in liquid organic fuels, although it may be applied to any case where it is desired to detect or measure the presence of particles in fluids.

It will also be appreciated that radiant energy other than light may be projected across the filter 11 and appropriate measuring means, other than the photo-electric cell, may be employed. For example, X-rays and suitable detection means therefor may be used to advantage for the selective detection of particles of particular materials having a relatively high absorption of X-rays.

It will be understood that modifications and variations may be effected without departing from the spirit and scope of the novel concepts of the present invention.

We claim as our invention:

1. In apparatus for detecting particles in fluids, means defining a fluid flow chamber, a filter element having a substantially planar surface portion and arranged in the path of fluid flow in said chamber to collect particles on said planar surface portion, first and second radiant energy shields on opposite sides of said chamber each having a slot therein, one edge of each slot being substantially in the same plane as said planar surface portion and the other edge of each slot being spaced a small distance from said plane, a radiant energy source, and a cell responsive to radiant energy, said source and said cell being disposed on opposite sides of said chamber in alignment with said slots, whereby particles accumulating on said planar surface of said filter will obstruct the path of radiant energy between said source and said cell.

2. In apparatus for detecting particles in fluids, a housing, a partition in said housing dividing the same into first and second sections, a photoelectric cell in said first section, means defining a fluid flow chamber in said second section, a filter element having a substantially planar surface portion and arranged in the path of fluid flow in said chamber to collect particles on said planar surface portion, said partition and the opposing wall of said second section having means defining narrow apertures substantially aligned with the region of particle accumulation on said planar surface portion, and a light source for projecting light through the aperture in said opposing wall, through the region of particle accumulation and through the aperture in said partition to said photo-electric cell.

3. In apparatus for detecting particles in fluids, means defining a fluid flow chamber, a filter element having a substantially planar surface portion and arranged in the path of fluid flow in said chamber to collect particles on said planar surface portion, first and second radiant energy shields on opposite sides of said chamber, means including adjustable shutter means defining adjustable slots in said shield aligned with the region of particle accumulation on said planar surface portion, a radiant energy source, and a cell responsive to radiant energy, said source and said cell being disposed on opposite sides of said chamber in alignment with said slots, whereby particles accumulating on said planar surface of said filter will obstruct the path of radiant energy between said source and said cell.

References Cited in the file of this patent
UNITED STATES PATENTS

| Number | Name | Date |
| --- | --- | --- |
| 1,758,088 | Schmick | May 13, 1930 |
| 1,963,128 | Geister | June 19, 1934 |
| 2,068,476 | Thomas | Jan. 19, 1937 |
| 2,076,554 | Drinker et al. | Apr. 13, 1937 |
| 2,097,650 | Stampe | Nov. 2, 1937 |
| 2,104,525 | Proskouriakoff | Jan. 4, 1938 |
| 2,290,170 | Dieffenbach | July 21, 1942 |
| 2,313,304 | Van Dranen | Mar. 9, 1943 |
| 2,402,926 | Herschman | June 25, 1946 |
| 2,429,474 | McMahon | Oct. 21, 1947 |
| 2,489,286 | Grant | Nov. 29, 1949 |
| 2,545,162 | Muly et al. | Mar. 13, 1951 |
| 2,572,436 | Boucher et al. | Oct. 23, 1951 |
| 2,574,359 | Thomas | Nov. 6, 1951 |
| 2,638,688 | Hazelton | May 19, 1953 |
| 2,690,694 | Wilson | Oct. 5, 1954 |